T. Fowler.
Papering Pins.
N° 18,043. Patented Aug. 25, 1857.
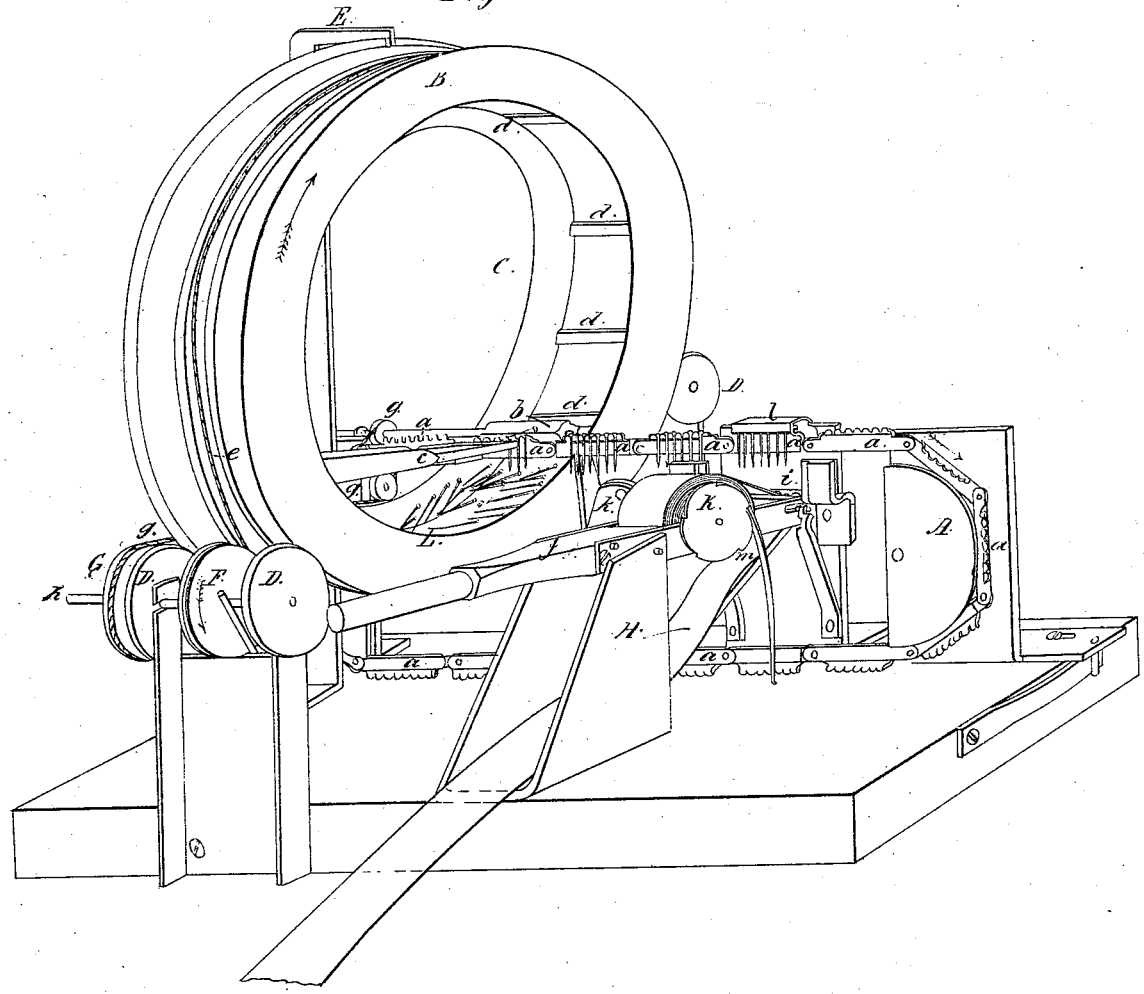
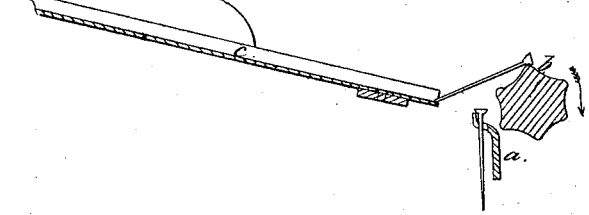

UNITED STATES PATENT OFFICE.

THADDEUS FOWLER, OF WATERBURY, CONNECTICUT.

PIN-STICKING MACHINE.

Specification of Letters Patent No. 18,043, dated August 25, 1857.

*To all whom it may concern:*

Be it known that I, THADDEUS FOWLER, of the city of Waterbury, in the county of New Haven and State of Connecticut, have invented a new and useful Improvement in Machinery for Sticking Pins on Paper; and I do hereby declare that the following is a full, clear, and exact description of the construction, character, and operation of the same, reference being had to the accompanying drawings, which make a part of this specification, in which—

Figure 1, is a perspective view of the whole apparatus, showing the endless chain, flanged cylinder, &c. Fig. 2 is a section of the inclined plane, flanged cylinder, endless chain, &c., showing how the pins fall into the racks or spacers of the endless chain as they descend the inclined plane. Fig. 3, is a perspective view of one of the links of the endless chain.

My improvement consists in the use of an endless chain, composed of a series of racks which serve to separate the pins, space them, arrange them with their heads all in the same direction, (with the assistance of a longitudinally flanged cylinder,) and carry them to the proper place for being inserted into the paper, in rows, or otherwise. And a revolving hopper to receive the pins and deposit them on an inclined plane so that they may pass down to the racks of the endless chain.

I make the endless chain of sheet brass, or any other suitable metal, with a rack on each link, as shown at *a*, &c., Fig. 1 and Fig. 3, of sufficient extent to contain the number of pins desired to be inserted at one operation of the sticker. I suspend this endless chain in proper grooves as shown at A, Fig. 1, (using grooved rollers when deemed necessary,) or any other means found most convenient to keep it extended and allow it to travel freely in passing around. I move this endless chain to the extent of one link at a time, by a lever connected with the sticking apparatus, the fulcrum of which is seen at *k*, Fig. 1, or by any other convenient means, so that a link of the endless chain will always exactly correspond with the sticker.

I make the longitudinally flanged cylinder of cast iron, or any other suitable material, substantially, in the shape shown at *b*, Fig. 1, and in cross section in Fig. 2, and of a length, at least, equal to the length of the rack on the link of the endless chain.

I fit a trough, or shoe, on an inclined plane, as shown at *c*, Fig. 1, and in section at *c*, Fig. 2, of a width suited the length of the rack on the endless chain, down which inclined plane the pins pass to the flanged cylinder, *b*, and fall into the rack *a*, where they are caught by the heads, and remain suspended until carried by the operation of the endless chain to the place of being inserted into the crimped paper.

I use a wheel, or revolving hopper, or reservoir, as B, having raised edges on the inner, or concave, surface, as shown at C, Fig. 1, and cross ledges on the inside, as shown at *d*, *d*, &c., to carry up the pins, as the wheel, or circle, revolves, (in the direction indicated by the dart,) and drops them on the inclined plane, *c*, Figs. 1, and 2. I sustain this revolving hopper, B, on four grooved rollers, at D, D, D, (the other not seen,) and steady the top part by an elbow shaped stud, E, or by any other convenient means; and I revolve it by a crossed band, at *e*, working on the pulley, F. And I revolve the flanged cylinder, *b*, Figs. 1, and 2, by a crossed band, as *g*, worked by the pulley, G, on the same shaft, or arbor, with the pulley, F. This arbor, with its pulleys, may be put in motion by a crank, as *h*, or by any other means, and any convenient power may be applied to it, to revolve the wheel, or revolving hopper, B, and the flanged cylinder, *b*,—and gear wheels may be used instead of pulleys and bands, if thought best.

For crimping, and clamping, the paper, H, I use what is commonly called, " Howe's crimping jaws" attached to a brake, or lever, I, as seen at *i*, or any other convenient method of crimping the paper, and holding it while the pins are being inserted. And I carry the paper away, as fast as it is filled with pins, by the operation of a roller, as K, or by any other means.

Having constructed the several parts of the machine, and arranged them, substantially, as described, and shown in the drawings, I pour, or shovel, the pins into the revolving hopper, B, as shown at L, Fig. 1, pass the paper, H, through the crimpers, as at *i*, and attach the end to the roller, K. I revolve the revolving hopper, B, (in the direction indicated by the dart,) by power applied to the crank, *h*, (or otherwise,) when the ledges *d, d*, &c., will carry up the pins, L, and allow them to fall onto the inclined plane *c*, Figs. 1 and 2, down which they will slide until their heads are caught by the flanges on the flanged cylinder, *b*, Figs. 1 and 2, which by its revolution will carry up the heads, as represented in Fig. 2, until the point falls from the inclined plane, *c*, when the pins will drop into the rack, and be sustained, or suspended, by the heads, as shown at *a*, &c., Figs. 1 and 2, until the rack on that link is completely filled. I then, by pressing down the outer end of the lever, I, bring the end of the lever which moves the endless chain, (the fulcrum of which is seen at *k*,) to take hold of the chain, between the links so that when the outer end of the lever, I, is again elevated the chain will be carried forward, or around, to the extent of one link, so as to bring the next link opposite the lower end of the inclined plane, *c*, when the rack of that will be filled as before, and so on, as shown at *a*, &c., Fig. 1.

When the pins have been carried to the place for inserting them into the paper, the rack passes under a cap, *l*, which prevent the pins from being thrown out of the rack, by the operation of inserting them into the paper. I then depress the outer end of the lever, I, when, by the operation of inclined planes, the crimping bars are closed to crimp, and hold the paper while it is forced against the points of the pins to insert them into the crimps of the paper. And when they are thus inserted, the crimping bars, or jaws, will be thrown open, (by a spring), to release the paper; and as the outer end of the lever, I, is again elevated, the hand, or dog *m*, will revolve the roller K, and remove the paper already filled; and the proper lever, (the fulcrum of which is at *k*,) will again move the endless chain the extent of one link, and thus bring another tier of pins to the position of being inserted into the paper, and so on to any desired extent. Should any other form of crimper, &c., be used, the whole must be so arranged, as to correspond with the racks on the endless chain.

The advantages of my improvement consist in that the endless chain, with the assistance of the flanged cylinder, *b*, serves to separate, space, arrange, and convey, the pins to the place of being inserted into the paper, and with the assistance of the cap, *l*, hold them while being inserted. And in that the revolving hopper will again receive all the pins which pass over the flanged cylinder point foremost, or otherwise, or fall before or behind the rack, on account of its being full, or for any other cause, and will carry them up again as in the first instance. If any other kind of hopper be used, as may be, this last advantage will not be realized.

What I claim as my invention, and desire to secure by Letters Patent, is—

1. The endless chain, with its racks, in combination with the flanged cylinder, (whether with, or without, the revolving hopper,) when constructed, arranged, and made to produce the result, substantially, as herein described.

2. I also claim the combination of the endless chain with the revolving hopper, when the whole is constructed, and combined, substantially, as herein described.

THADDEUS FOWLER.

Witnesses:
A. L. KINSTON,
R. FITZGERALD.